US012509916B2

(12) United States Patent
Sintonen et al.

(10) Patent No.: US 12,509,916 B2
(45) Date of Patent: Dec. 30, 2025

(54) ELECTROMECHANICAL LOCK CYLINDER

(71) Applicant: iLOQ Oy, Oulu (FI)

(72) Inventors: Tommi Sintonen, Oulu (FI); Matti Ylitalo, Oulu (FI); Juha Kyrönlampi, Oulu (FI)

(73) Assignee: iLOQ Oy, Oulu (FI)

( * ) Notice: Subject to any disclaimer, the term of this patent is extended or adjusted under 35 U.S.C. 154(b) by 0 days.

(21) Appl. No.: 17/733,372

(22) Filed: Apr. 29, 2022

(65) Prior Publication Data

US 2023/0349195 A1 Nov. 2, 2023

(51) Int. Cl.
*E05B 47/06* (2006.01)
*E05B 1/00* (2006.01)
*E05B 47/00* (2006.01)

(52) U.S. Cl.
CPC ........ *E05B 47/0649* (2013.01); *E05B 1/0053* (2013.01); *E05B 47/0038* (2013.01); *E05B 2047/0057* (2013.01)

(58) Field of Classification Search
CPC ............... E05B 47/0649; E05B 1/0053; E05B 2047/0057; E05B 2047/0026;
(Continued)

(56) References Cited

U.S. PATENT DOCUMENTS 3,326,588 A * 6/1967 Gordon ................... E05C 19/16 292/251.5
3,376,615 A * 4/1968 Heckman .............. E05B 47/004 215/354

(Continued)

FOREIGN PATENT DOCUMENTS

DE 10 2016 004 983 3/2021
DE 10 2012 108 998 5/2022

(Continued)

OTHER PUBLICATIONS

Aug. 22, 2023 International Search Report issued in International Patent Application No. PCT/EP2023/061067, pp. 1-13.

*Primary Examiner* — Christine M Mills
*Assistant Examiner* — Faria F Ahmad
(74) *Attorney, Agent, or Firm* — Nixon & Vanderhye PC

(57) ABSTRACT

An electromechanical lock cylinder. The cylinder includes a core front end, a core back end coupled with a tailpiece, an actuator mechanism, switchable between a locked state and an unlocked state, to keep the core front end uncoupled with the core back end in the locked state, to couple the core front end with the core back end in the unlocked state to enable the core front end to rotate the core back end from a locked rear position to an unlocked rear position, and to return to keep the core front end uncoupled with the core back end in the locked state; an enforced coupling to couple the core front end with the core back end as the core front end starts to rotate the core back end away from the locked rear position in the unlocked state, and decouple the core front end from the core back end as the core back end returns to the locked rear position; an operation knob, coupled with the core front end, to enable a user to rotate the operation knob from an initial knob position so that the core front end rotates the core back end from the locked rear position to the unlocked rear position in the unlocked state; and a return force mechanism to rotate the operation knob further after the user first has rotated the operation knob away from the initial knob position and then released the operation knob, whereby the core back end is rotated to the locked rear position by the core front end due to the coupled enforced coupling.

19 Claims, 11 Drawing Sheets

(58) Field of Classification Search
CPC ..... E05B 2047/0028; E05B 2047/0031; E05B 47/0038; E05B 47/0042; E05B 47/0043; E05B 47/0044; E05B 47/0045
See application file for complete search history.

(56) References Cited

U.S. PATENT DOCUMENTS

| | | | | |
|---|---|---|---|---|
| 3,566,637 | A * | 3/1971 | Hallmann | E05B 47/0044 70/276 |
| 3,748,878 | A * | 7/1973 | Balzano | E05B 13/005 192/84.92 |
| 4,689,977 | A * | 9/1987 | Wolniak | H01H 27/06 70/DIG. 72 |
| 4,854,146 | A * | 8/1989 | O'Connell | E05B 47/0603 70/277 |
| 4,941,697 | A * | 7/1990 | Fan | E05B 17/0058 464/36 |
| 5,839,305 | A * | 11/1998 | Aston | E05B 47/063 70/283.1 |
| 5,887,465 | A * | 3/1999 | Shen | E05B 3/065 292/357 |
| 5,933,086 | A * | 8/1999 | Tischendorf | G07C 9/00817 340/5.64 |
| 6,363,762 | B1 * | 4/2002 | Kueng | E05B 47/063 70/283.1 |
| 7,559,219 | B2 * | 7/2009 | Chen | E05B 65/1086 292/336.3 |
| 7,889,036 | B2 * | 2/2011 | Fiedler | H01F 7/0263 335/302 |
| 8,074,479 | B2 * | 12/2011 | Harley | E05B 47/0692 70/283.1 |
| 8,174,347 | B2 * | 5/2012 | Fullerton | G06F 1/1679 335/306 |
| 8,689,594 | B2 * | 4/2014 | Yanar | G07C 9/00944 70/279.1 |
| 8,912,871 | B2 * | 12/2014 | Lauraire | H01H 3/28 335/229 |
| 9,464,458 | B2 * | 10/2016 | Huang | E05B 1/003 |
| 10,145,143 | B1 * | 12/2018 | Mohammed | E05B 1/003 |
| 10,253,528 | B1 * | 4/2019 | Pukari | E05B 47/0038 |
| 10,298,037 | B2 * | 5/2019 | Wang | H01R 13/6205 |
| 10,443,269 | B2 | 10/2019 | Piirainen et al. | |
| 10,815,690 | B2 * | 10/2020 | Mohammed | E05B 1/003 |
| 10,890,014 | B2 * | 1/2021 | Pukari | G07C 9/00722 |
| 11,164,407 | B2 | 11/2021 | Tikkanen et al. | |
| 11,408,205 | B2 * | 8/2022 | Piirainen | E05B 47/0012 |
| 11,414,887 | B2 * | 8/2022 | Piirainen | E05B 47/0002 |
| 2005/0023841 | A1 * | 2/2005 | Chen | G06F 1/1679 292/251.5 |
| 2005/0052265 | A1 * | 3/2005 | Vladimirescu | H01F 7/1615 335/229 |
| 2006/0156771 | A1 * | 7/2006 | Hauri | E05B 47/0649 70/278.7 |
| 2008/0141743 | A1 * | 6/2008 | Andersson | E05B 47/063 70/283 |
| 2010/0008009 | A1 * | 1/2010 | Cartier-Millon | H01F 7/1872 361/156 |
| 2013/0167598 | A1 * | 7/2013 | Huang | E05B 13/101 74/25 |
| 2013/0167671 | A1 * | 7/2013 | Huang | E05B 47/068 74/25 |
| 2013/0241680 | A1 * | 9/2013 | Hanchett, Jr. | H01F 7/16 335/234 |
| 2018/0266146 | A1 * | 9/2018 | Huang | F16D 11/16 |
| 2019/0164675 | A1 * | 5/2019 | Srinivasan | E05C 19/16 |
| 2021/0207399 | A1 | 7/2021 | Piirainen et al. | |
| 2022/0162883 | A1 * | 5/2022 | Chen | E05B 47/0012 |

FOREIGN PATENT DOCUMENTS

| | | |
|---|---|---|
| EP | 2 568 101 | 11/2015 |
| EP | 3 751 078 | 12/2020 |
| WO | 2021/201767 | 10/2021 |

* cited by examiner

ELECTROMECHANICAL LOCK CYLINDER

FIELD

Various embodiments relate to an electromechanical lock cylinder.

BACKGROUND

Electromechanical locks are emerging to replace traditional mechanical locks. One branch of electromechanical locks are keyless electromechanical locks, wherein instead of having a key, a fixed operation knob may be used. The operation knob may include an antenna to receive the electric energy. The electric energy may be harvested from an NFC (Near-Field Communication) signal transmitted by a user apparatus, for example.

A specific problem relates to the keyless electromechanical locks. In traditional mechanical locks, as the correct key is pushed into the lock cylinder, internal tumblers (pins, discs, levers, or wafers, for example) release internal parts of the lock cylinder coupled with a tailpiece to rotate in unison with the key. As the key can only be removed in one position, it is easy to ensure, that the internal parts (and the tailpiece) are returned to a locked position before the key can be retracted.

However, the keyless electromechanical lock operates without the key, and thereby the reset of the lock is a problem.

BRIEF DESCRIPTION

According to an aspect, there is provided subject matter of independent claims. Dependent claims define some embodiments.

One or more examples of implementations are set forth in more detail in the accompanying drawings and the description of embodiments.

LIST OF DRAWINGS

Some embodiments will now be described with reference to the accompanying drawings, in which FIG. 1A, FIG. 1B, FIG. 1C, FIG. 1D, FIG. 1E, FIG. 1F, and FIG. 1G illustrate embodiments of an electromechanical lock cylinder;

Figure 4A:
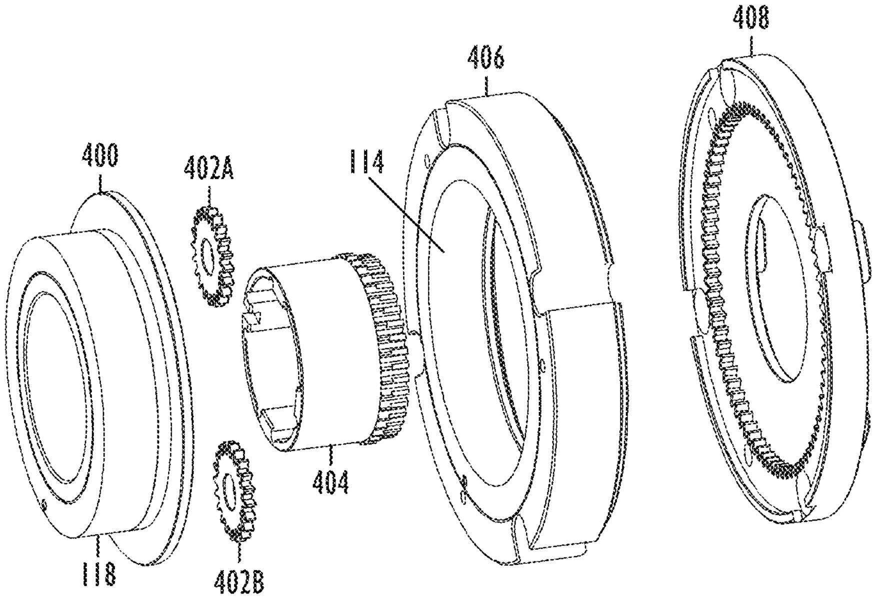
Figure 4B:
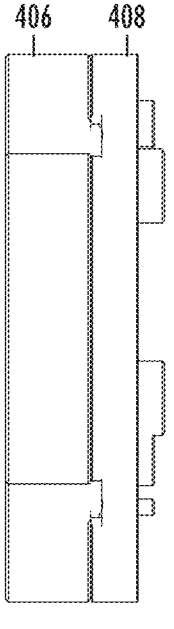
Figure 4C:
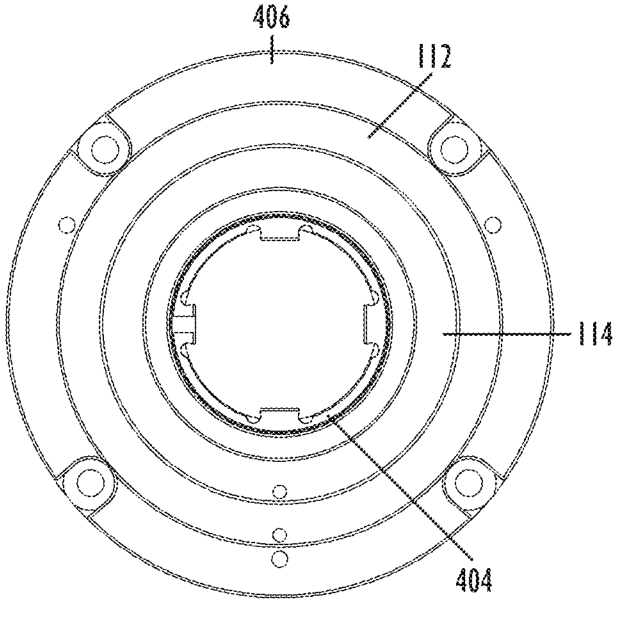
Figure 5A:
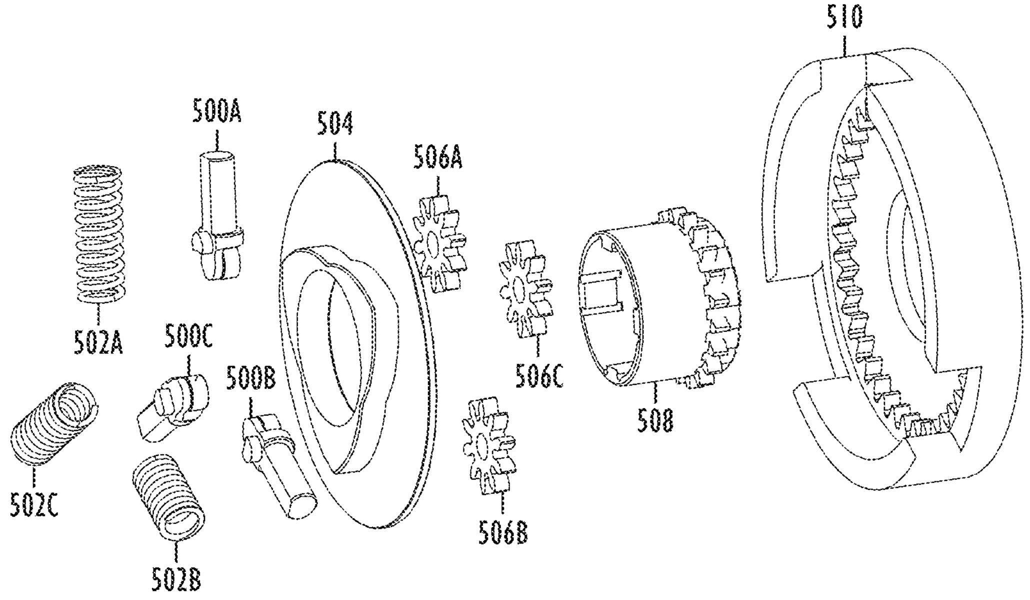
Figure 5B:
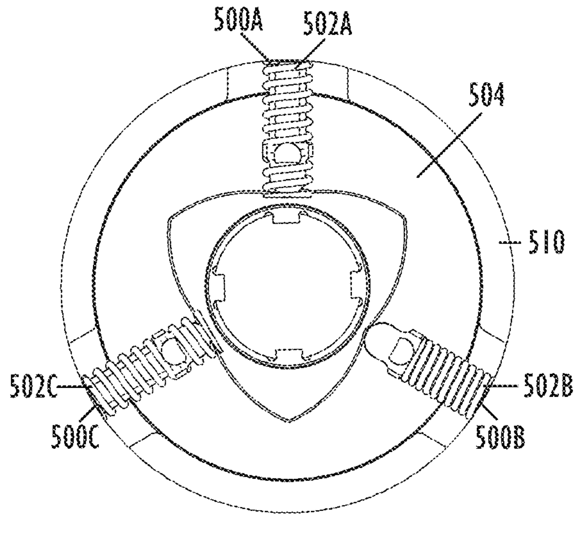
Figure 6A:
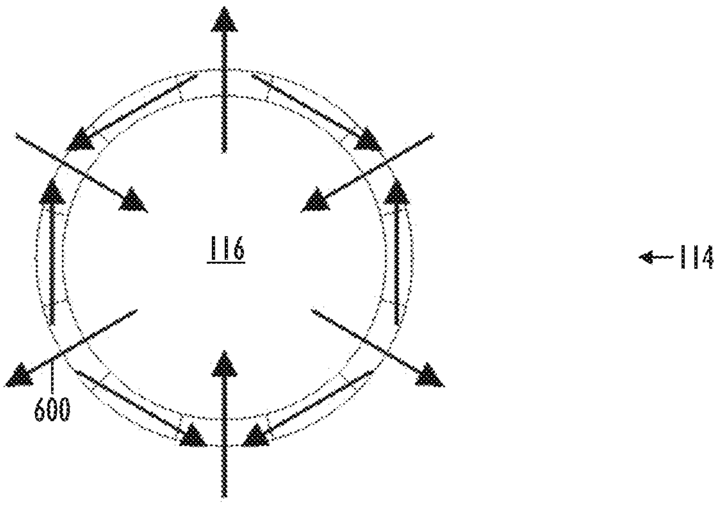
Figure 6B:
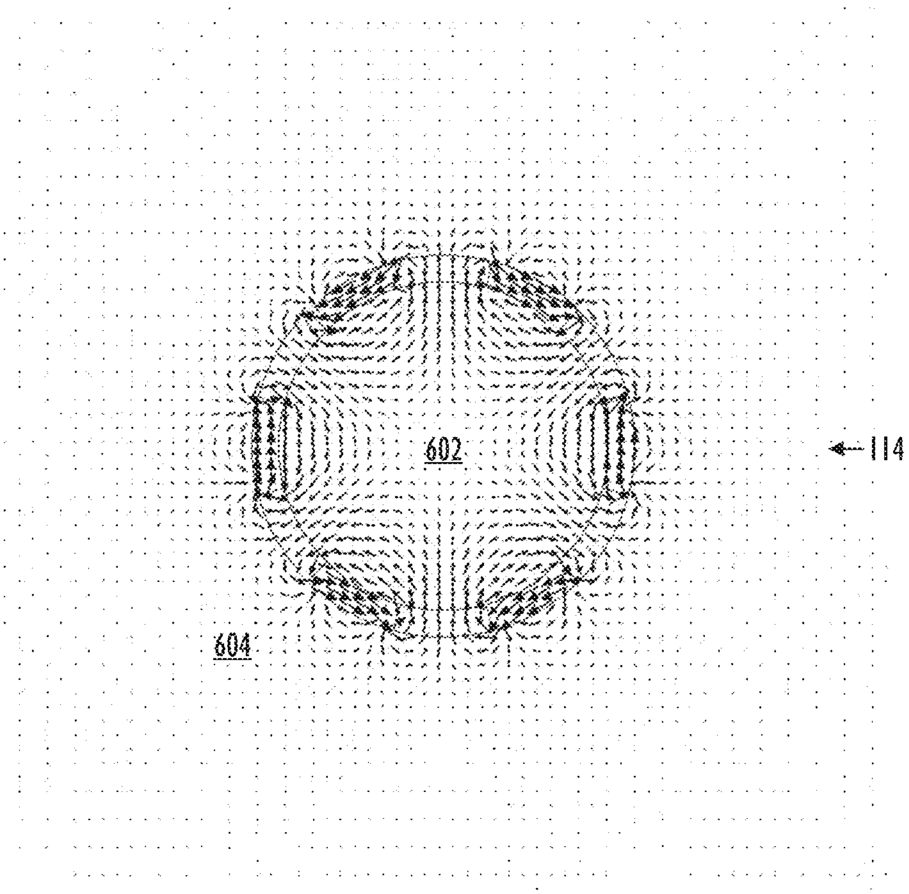
Figure 7A:
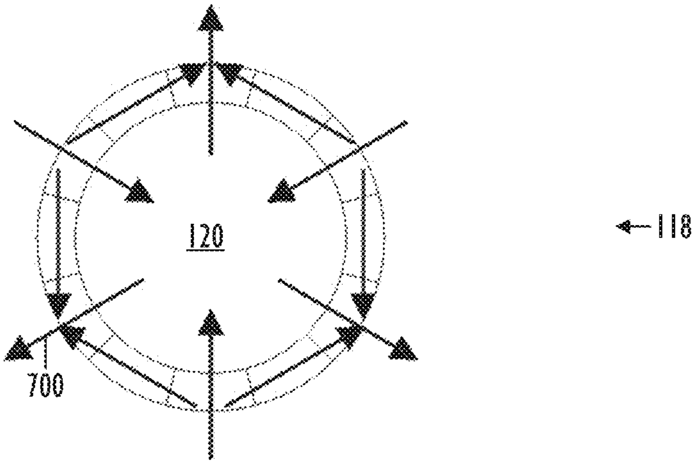
Figure 7B:
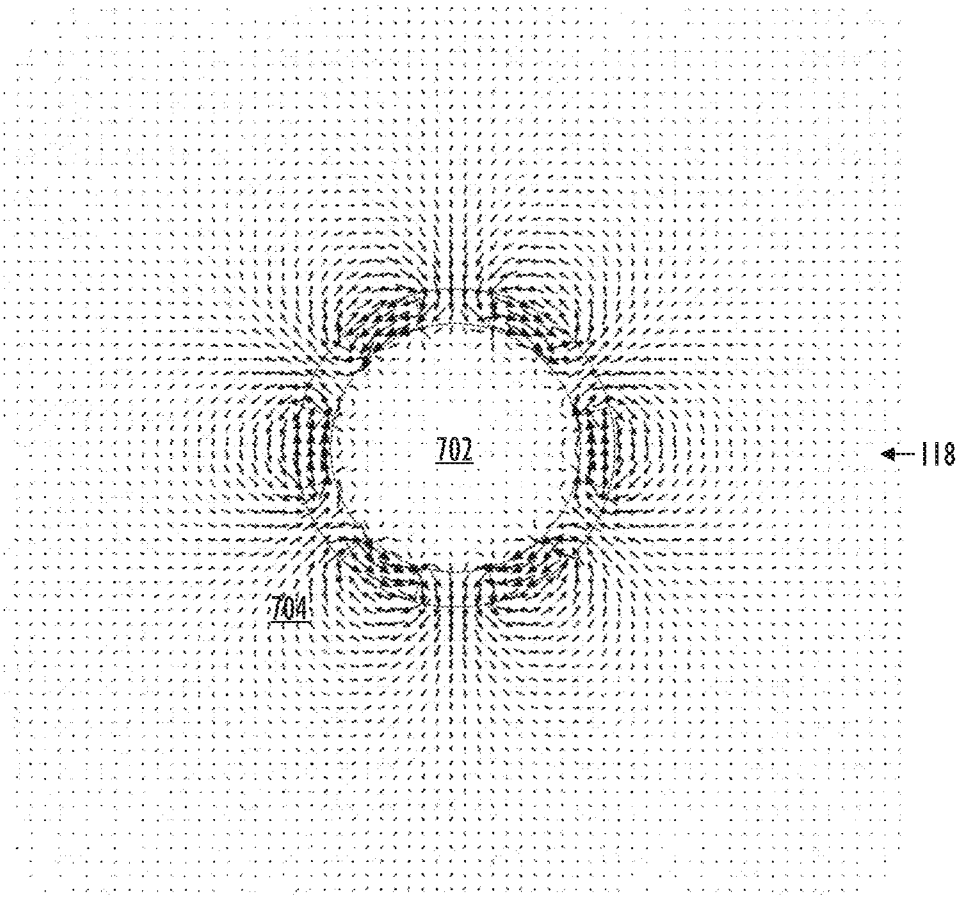
Figure 8A:
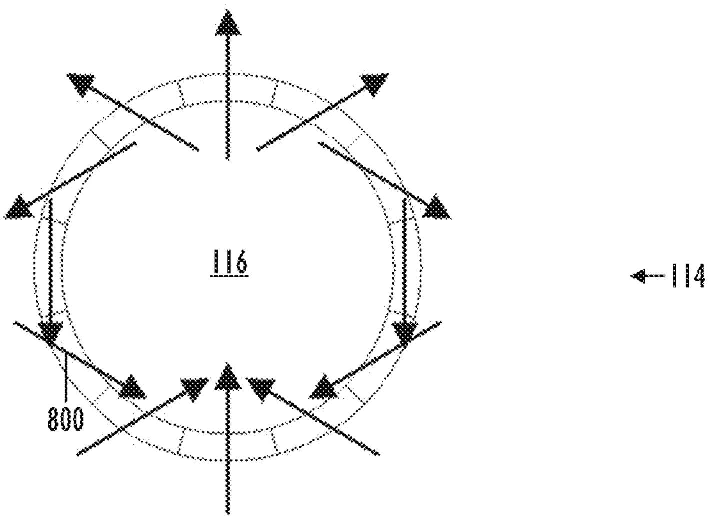
Figure 8B:
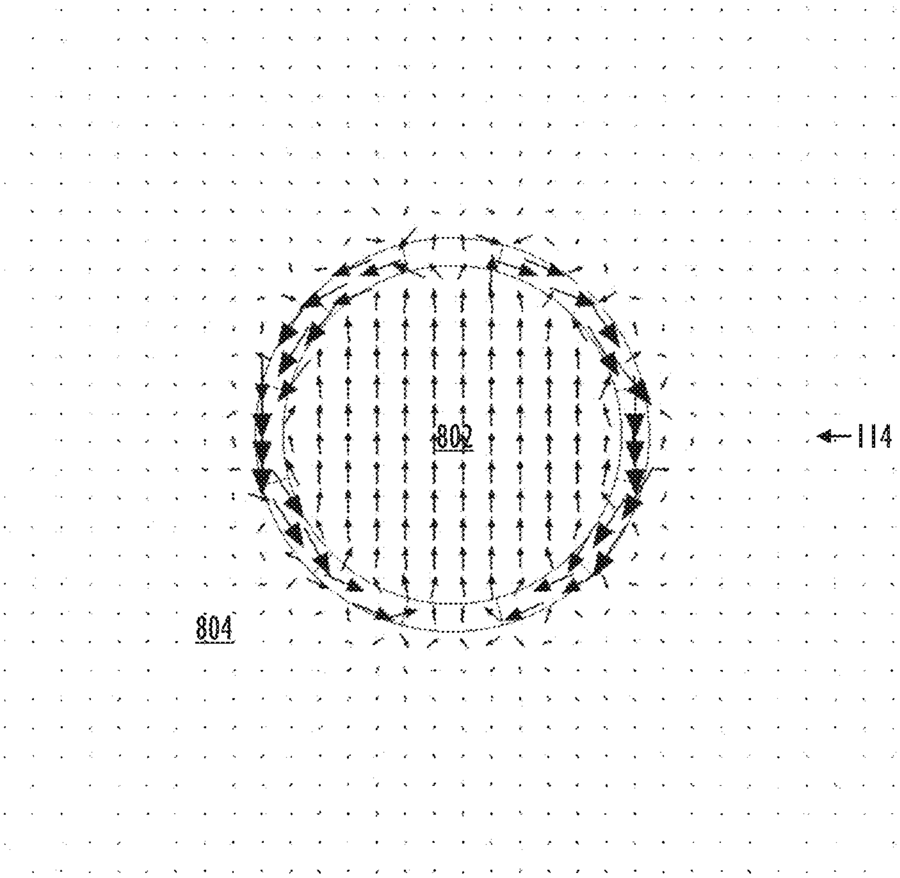

FIG. 4A, FIG. 4B, and FIG. 4C illustrate embodiments of a return force mechanism of the electromechanical lock cylinder;

FIG. 5A and FIG. 5B illustrate additional embodiments of the return force mechanism; and FIG. 6A and FIG. 6B, FIG. 7A and FIG. 7B, FIG. 8A and FIG. 8B, and FIG. 9A and FIG. 9B, illustrate pairwise additional embodiments of the return force mechanism and magnetic field forces involved.

DESCRIPTION OF EMBODIMENTS

The following embodiments are only examples. Although the specification may refer to "an" embodiment in several locations, this does not necessarily mean that each such reference is to the same embodiment(s), or that the feature only applies to a single embodiment. Single features of different embodiments may also be combined to provide other embodiments.

Furthermore, words "comprising" and "including" should be understood as not limiting the described embodiments to consist of only those features that have been mentioned and such embodiments may contain also features/structures that have not been specifically mentioned.

Reference numbers, both in the description of the embodiments and in the claims, serve to illustrate the embodiments with reference to the drawings, without limiting it to these examples only.

The embodiments and features, if any, disclosed in the following description that do not fall under the scope of the independent claims are to be interpreted as examples useful for understanding various embodiments of the invention.

Figure 1A:
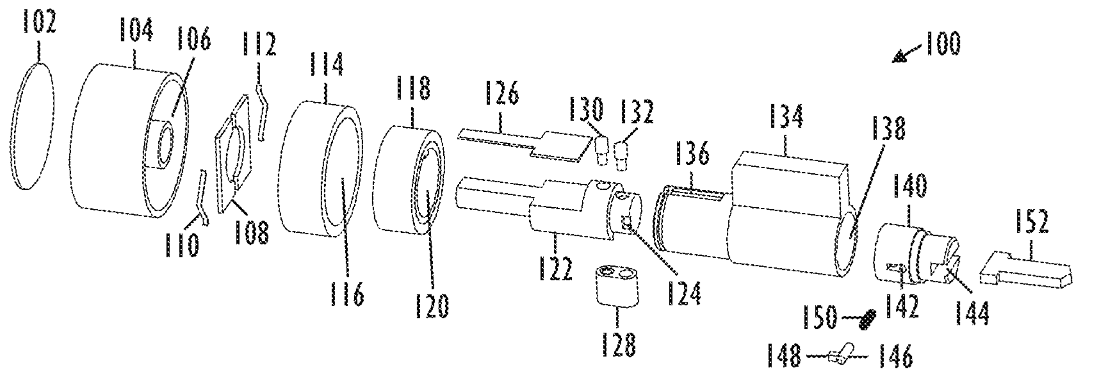
Figure 1B:
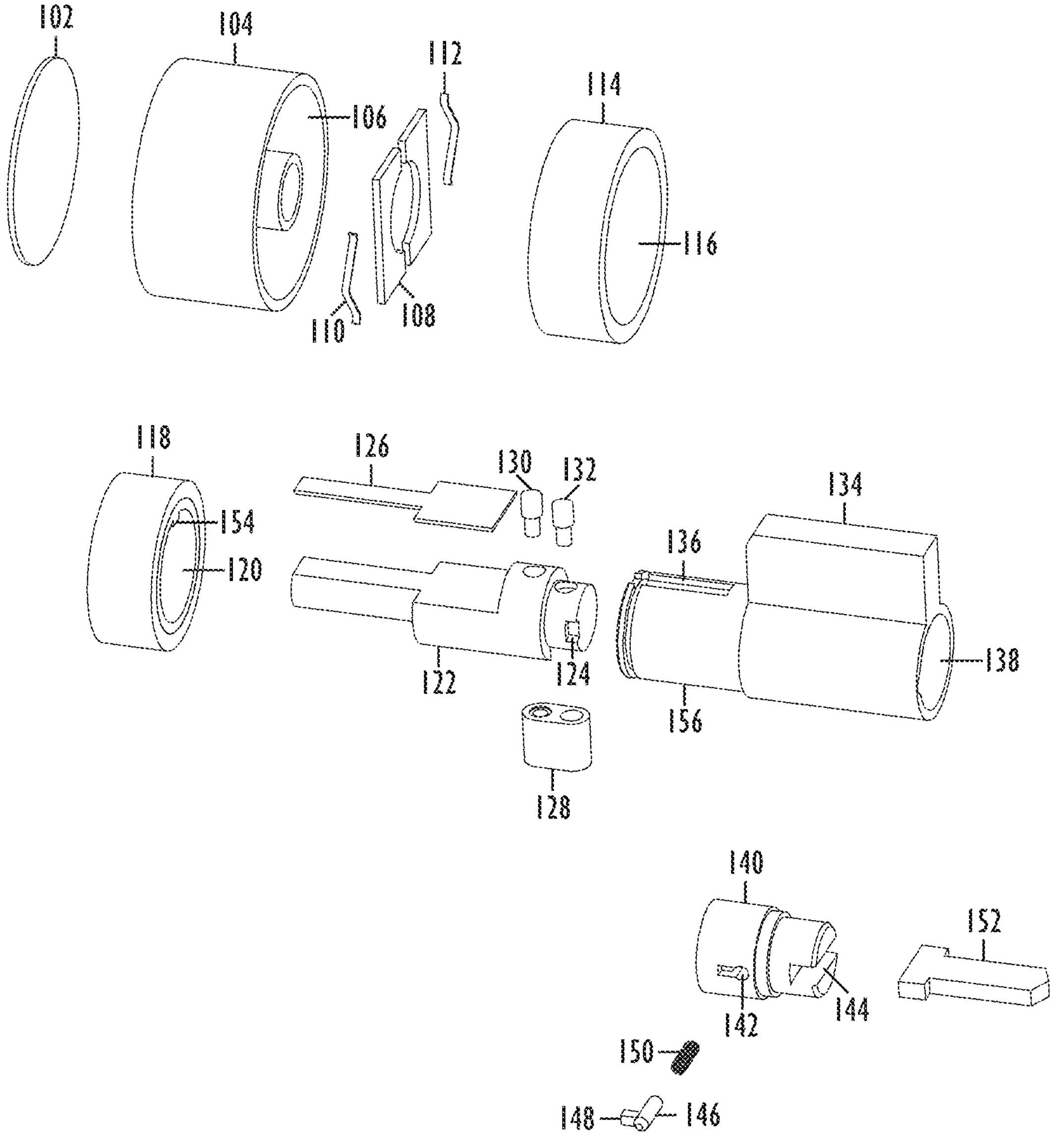
Figure 1C:
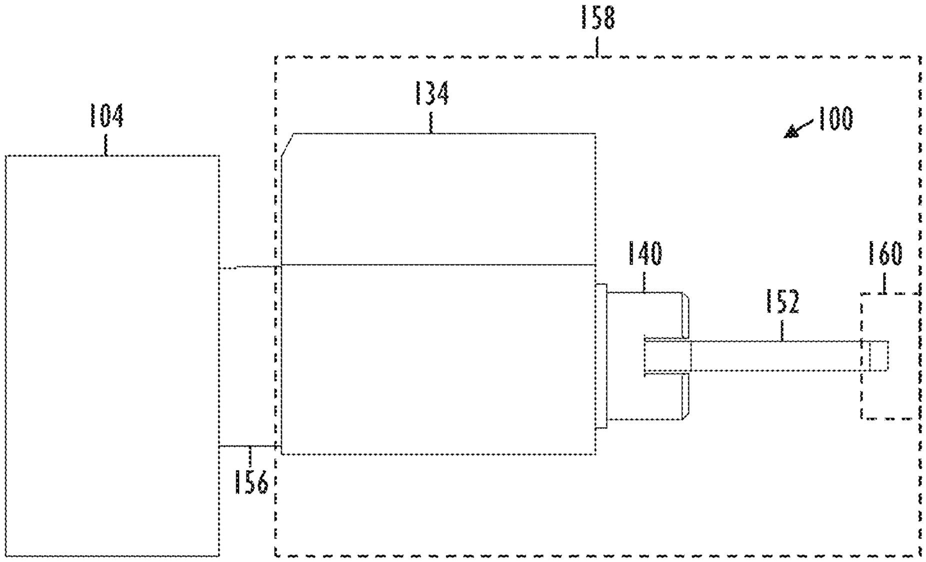
Figure 1D:
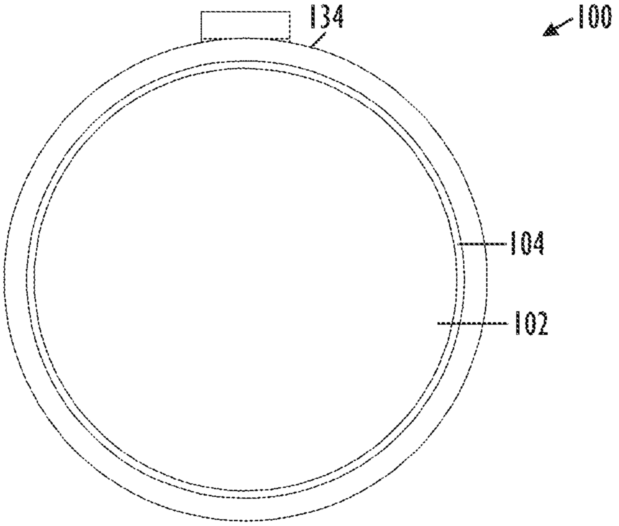
Figure 1E:
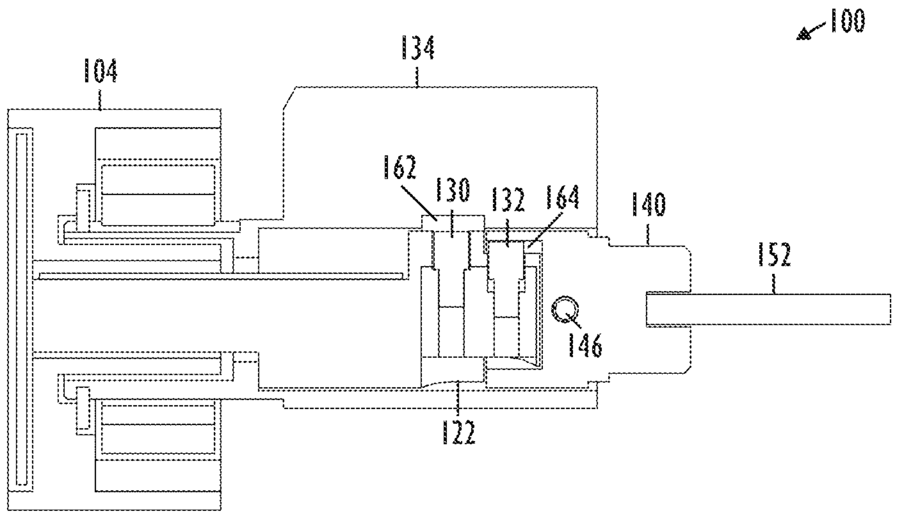
Figure 1F:
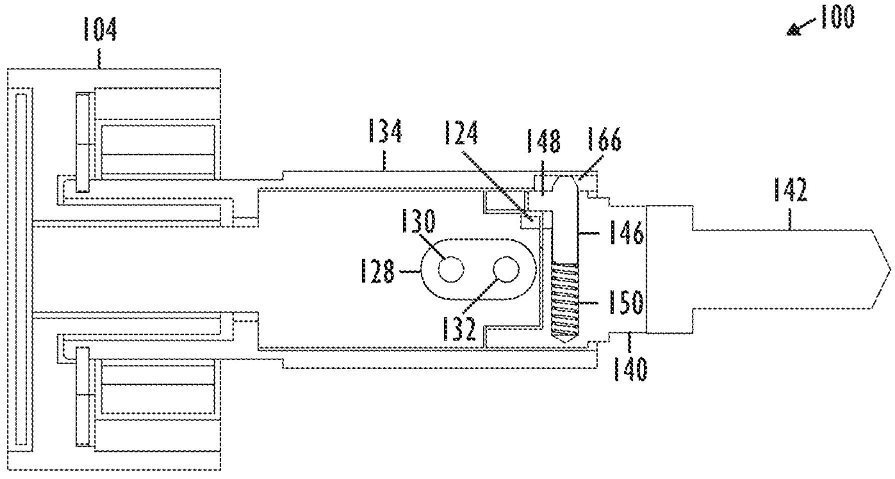

Let us now study an electromechanical lock cylinder 100 with reference to the drawings, wherein various views are illustrated:

FIG. 1A illustrating an exploded view;

FIG. 1B illustrating an enlarged exploded view;

FIG. 1C illustrating an external side view;

FIG. 1D illustrating an external end view towards an operation knob 104;

FIG. 1E illustrating an exploded side view;

FIG. 1F illustrating an exploded top view; and

Figure 1G:
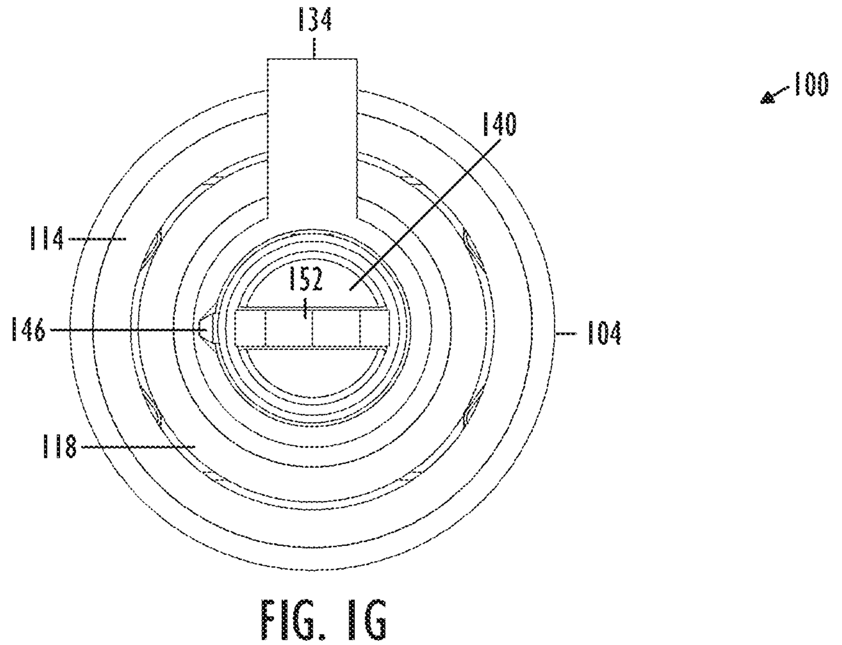

FIG. 1G illustrating an external end view towards a core back end 140 and a tailpiece 152.

In an embodiment, the electromechanical lock cylinder 100 operates without a key, i.e., as a keyless electromechanical lock cylinder 100.

The electromechanical lock cylinder 100 comprises a core front end 122, a core back end 140, an actuator mechanism 126, 128, 132, and an operation knob 104.

The core back end 140 is coupled with a tailpiece 152. As shown in FIG. 1B, the core back end 140 may include a cut out 144 to receive a matching end of the tailpiece 152.

The tailpiece 152 is coupleable to a bolt mechanism 160.

The actuator mechanism 126, 128, 132 is switchable between a locked state and an unlocked state.

The actuator mechanism 126, 128, 132 is configured:

- to keep the core front end 122 uncoupled with the core back end 140 in the locked state;
- to couple the core front end 122 with the core back 140 end in the unlocked state to enable the core front end 122 to rotate the core back end 140 from a locked rear position to an unlocked rear position; and
- to return to keep the core front end 122 uncoupled with the core back end 140 in the locked state.

The operation knob 104 is coupled with the core front end 122. The operation knob 104 is configured to enable a user to rotate the operation knob 104 from an initial knob position so that the core front end 122 rotates the core back end 140 from the locked rear position to the unlocked rear position in the unlocked state.

In an embodiment, the actuator mechanism 126, 128, 132 switches from the locked state to the unlocked state by coupling the core front end 122 to the core back end 140 by inserting a coupling pin 132 into a notch 164.

In an additional embodiment, the actuator mechanism 126, 128, 132 switches from the locked state to the unlocked state by additionally releasing the core front end 122 to rotate by withdrawing a locking pin 130 from a notch 162 in a core body 134 of the electromechanical lock cylinder 100.

In an embodiment, the actuator mechanism 126, 128, 132 switches from the locked state to the unlocked state by changing an internal magnetic field configuration to operate the coupling pin 132 and the locking pin 130.

In an embodiment, the locking pin 130 and the coupling pin 132 may be housed in a same case 128. The pins 130, 132 may be implemented as moving permanent hard magnets, and the case 128 may comprise stationary permanent semi-hard magnets, whose magnetization configurations may be changed by electrically powered magnetization coils housed in the case 128. With this kind of operation, both pins 130, 132 may move simultaneously.

The core front end 122 and the core back end 140 may be housed in a hollow 138 of a core body 134.

In an embodiment, the electromechanical lock cylinder 100 is configured so that the core body 134 defines its external surface according to a technology standard related to locks. In this way, a standard mechanical lock cylinder may be replaced with the electromechanical lock cylinder 100. ANSI (American National Standards Institute), for example, defines such technology standards. However, the electromechanical lock cylinder 100 may be designed and dimensioned so that instead of a lock standard, the electromechanical lock cylinder 100 may be fitted into a space defined by a proprietary lock specification. In an embodiment, the electromechanical lock cylinder 100 is a key-in-knob (KIK) type cylinder, a key-in-lever (KIL) type cylinder, a mortise cylinder, a rim cylinder, a small format interchangeable core (SFIC) cylinder, or a large format interchangeable core (LFIC) cylinder.

Figure 3A:
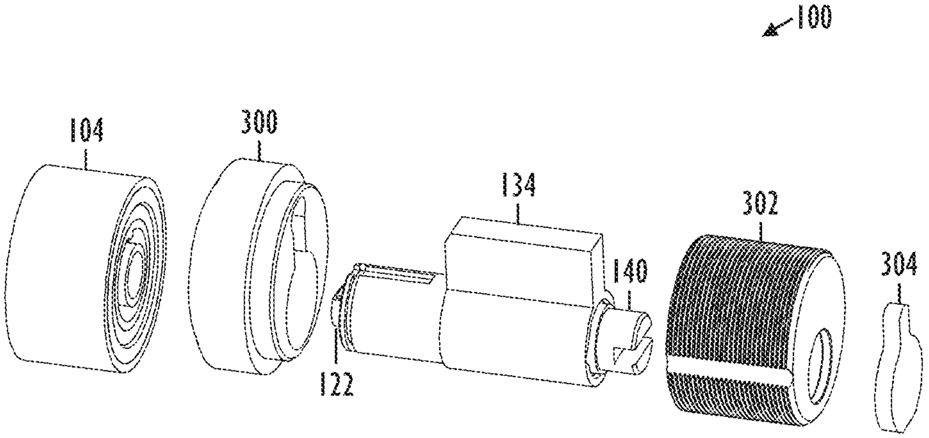
FIG. 3A and FIG. 3B illustrate embodiments of adaptors for the electromechanical lock cylinder.
Figure 3B:
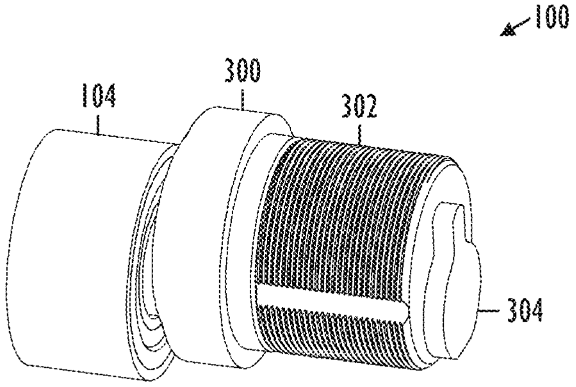

In an embodiment illustrated in FIG. 3A and FIG. 3B, modular parts 300, 302, 306 adapt the electromechanical lock cylinder 100, which is designed as a KIK cylinder so that it may be fitted into an installation requiring a mortise cylinder. With the same principle, other kinds of modular parts may be designed to enable an installation of a general electromechanical lock cylinder 100 in place of various standard or proprietary cylinders.

The above described core mechanism and its operation is described in more detail in other patents and applications by the applicant, such as U.S. Pat. No. 10,443,269 B2 and US 2021/0207399 A1, incorporated herein as references in all jurisdictions where applicable.

In an embodiment, the electromechanical lock cylinder 100 further comprises an antenna 102 in the operation knob 104 to receive wirelessly encrypted data from a portable user apparatus, and a processor 126 to switch the actuator mechanism 126, 128, 132 from the locked state to the unlocked state provided that the received encrypted data matches a predetermined condition. Note that in FIG. 1B, the processor 126 is represented by a printed circuit board, which is then provided with the needed electronics.

In an embodiment, the antenna 102 is further configured to harvest wirelessly electric energy from the portable user apparatus for the operation of the electromechanical lock cylinder 100.

U.S. Pat. No. 11,164,407 B2, another patent of the applicant, incorporated herein as a reference in all jurisdictions where applicable, illustrates operation of the Near-Field Communication (NFC) protocol enabling the wireless communication and energy harvesting of the electromechanical lock cylinder 100.

The electromechanical lock cylinder 100 further comprises an enforced coupling 124, 142, 146, 148, 150 and a return force mechanism 114, 118. With these two novel structures, the reset of the internals parts of the electromechanical lock cylinder 100 is achieved.

As shown in FIG. 1B, the operation knob 104 may comprise a hollow 106 to house the return force mechanism 114, 118, and fastening parts 108, 110, 112.

The enforced coupling 124, 142, 146, 148, 150 is configured to couple the core front end 122 with the core back end 140 as the core front end 122 starts to rotate the core back end 140 away from the locked rear position in the unlocked state and decouple the core front end 122 from the core back end 140 as the core back end 140 returns to the locked rear position.

As shown in FIG. 1F, the enforced coupling may be implemented as a pin 146 movable in a slot 142 of the core back end 140. The pin 146 retracts in the slot 142 against a spring 150 from a notch 166 as the cylinder is rotated, and a protrusion 148 of the pin 146 enters a notch 124 in the core front end 122, thereby coupling the core front end 122 with the core back end 140. As the core back end 140 is rotated to the locked rear position by the core front end 122, the spring 150 pushes the pin 146 back into the 166 notch, thereby releasing the enforced coupling.

The return force mechanism 114, 118 is configured to rotate the operation knob 104 further after the user first has rotated the operation knob 104 away from the initial knob position and then released the operation knob 104, whereby the core back end 140 is rotated to the locked rear position by the core front end 122 due to the coupled enforced coupling 124, 142, 146, 148, 150.

In an embodiment, the return force mechanism comprises a first magnetic part 114 coupled with the operation knob 104, and a second magnetic part 118 coupled with a core body 134 of the electromechanical lock cylinder 100, wherein an interaction between a first magnetic force field of the first magnetic part 114 and a second magnetic force field of the second magnetic part 118 rotates the operation knob 104 further, whereby the core back end 140 is rotated to the locked rear position by the core front end 122 due to the coupled enforced coupling 124, 142, 146, 148, 150. As shown in FIG. 1B, the second magnetic part 118 may comprise a protrusion 154 to enter a counterpart groove 136 in the core body 134. The protrusion 154 may be formed into a separate ring fixed against the inner wall of the second magnetic part 118.

In an embodiment, the first magnetic part is configured as an outer magnetic ring 114 coupled with the operation knob 104, and the second magnetic part is configured as an inner magnetic ring 118 coupled with the core body 134 of the electromechanical lock cylinder 100.

In an embodiment, the inner magnetic ring 118 is positioned in a bore 116 of the outer magnetic ring 114.

Figure 2A:
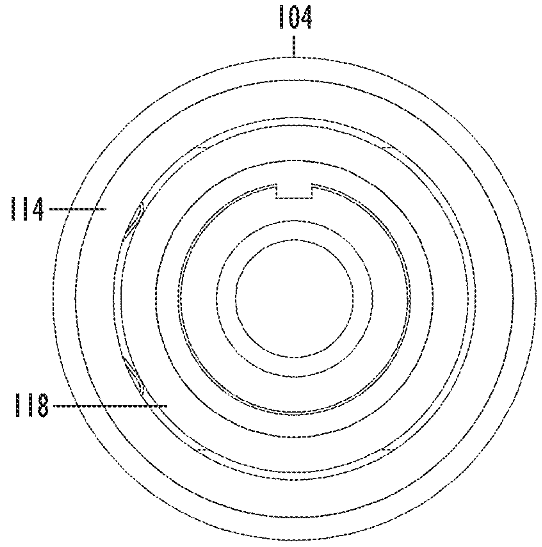
FIG. 2A and FIG. 2B illustrate embodiments of an operation knob.
Figure 2B:
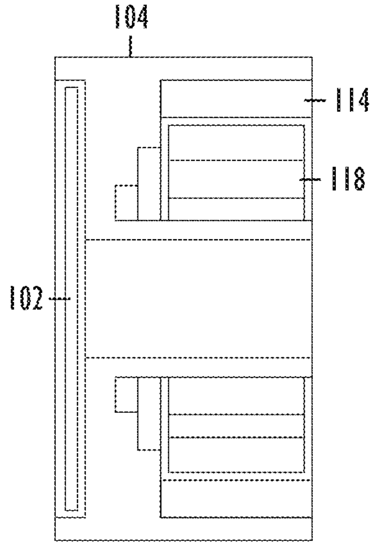

FIG. 2A illustrates an exploded view of the operation knob 104 viewed towards an end of the operation knob 104 so that the inner magnetic 118 and the outer magnetic ring 114 are visible. FIG. 2B illustrates an exploded view of the operation knob 104 viewed from the side.

In an embodiment illustrated in FIG. 6A, FIG. 6B, FIG. 7A and FIG. 7B, the outer magnetic ring 114 is arranged as a Halbach cylinder so that a magnetic field is augmented 602 towards a bore 116 of the outer magnetic ring 114 and cancelled 604 towards the operation knob 104, and the inner magnetic ring 118 is arranged as a Halbach cylinder so that a magnetic field is augmented 704 towards the outer magnetic ring 114 and cancelled 702 towards a bore 120 of the inner magnetic ring 118. Arrows 600, 700 illustrate various magnetization patterns creating the magnetic fields 602, 604, 702, 704. In the embodiment illustrated in FIG. 6A and FIG. 6B, the Halbach cylinder has the Halbach cylinder configuration k=4. In the embodiment illustrated in FIG. 7A and FIG. 7B, the Halbach cylinder has the Halbach cylinder configuration k=−4.

In an embodiment illustrated in FIG. 4A, FIG. 4B and FIG. 4C, the return force mechanism comprises a planetary gear 400, 402A, 402B, 404, 408 to transmit the rotation of the operation knob 104 to the core front end 122 with a gear ratio of 1:n, wherein n is greater than 1 and n is equal to a number of magnetic equilibrium positions for the inner magnetic ring 118 along the outer magnetic ring 114. In the illustrated embodiment, n=3, whereby three magnetic equilibrium positions are realized. The magnetic force field between the first magnetic part 114 and the second magnetic part 118 rotates the operation knob 104 further to one of the magnetic equilibrium positions, whereby the core back end 140 is rotated to the locked rear position by the core front end 122 due to the coupled enforced coupling 124, 142, 146, 148, 150. The planetary gear may be implemented as shown: the inner magnetic ring 118 is fixed to a planetary carrier 400, planetary cogwheels (at least one, in this example three of which two are shown) 402A, 402B, a central sun gear 404 being fixed to the core body 134, the outer magnetic ring 114 is fixed to an external ring 406, and an outer ring 408 with a toothing and fixed to the external ring 406.

Figure 9A:
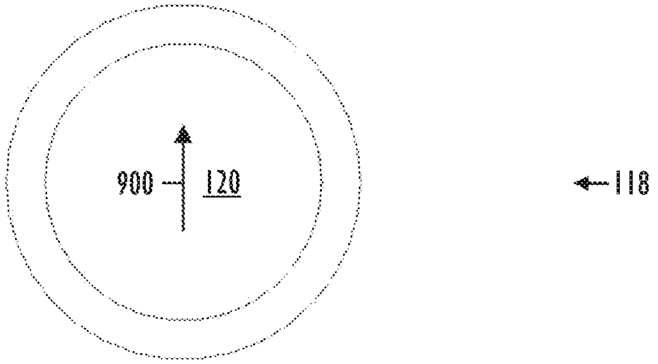
Figure 9B:
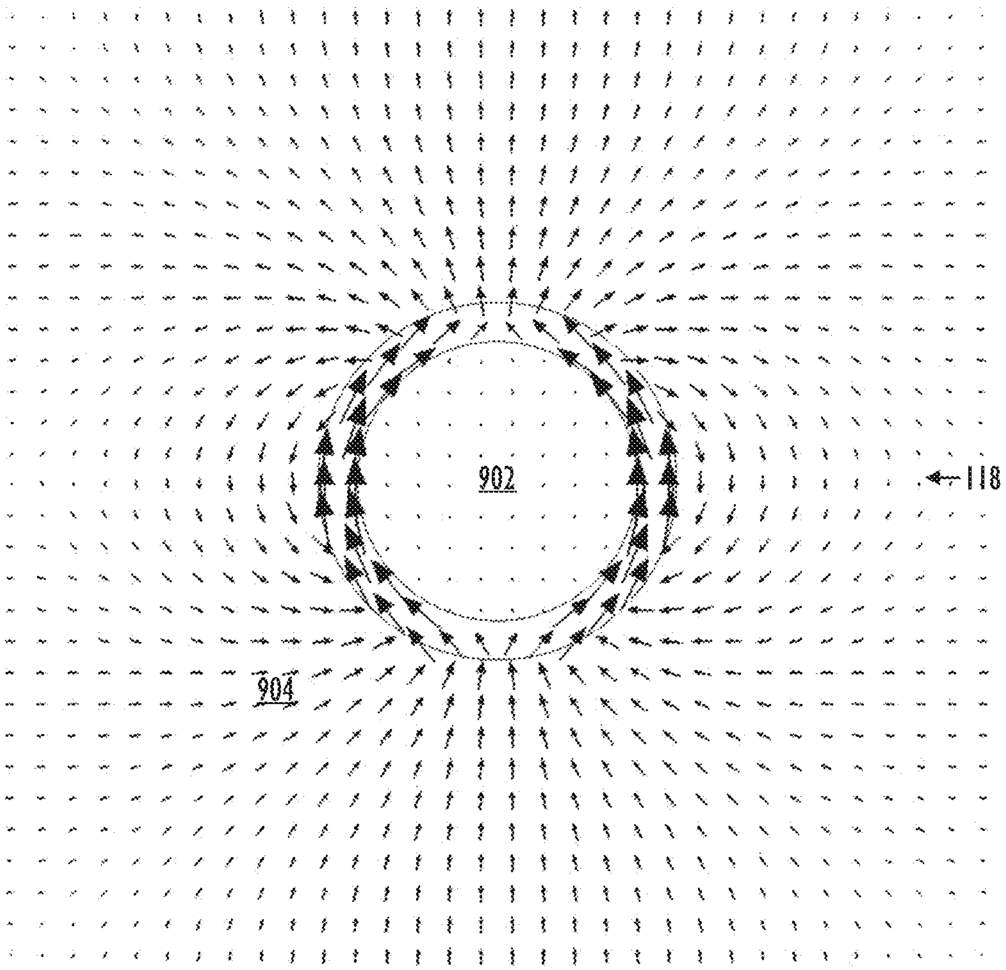

In an embodiment illustrated in FIG. 8A, FIG. 8B, FIG. 9A and FIG. 9B, the first magnetic part comprises an outer magnetic ring 114 coupled with the operation knob 104 to create an uniform magnetic force field 802 inside of a bore 116 of the outer magnetic ring 114, and the second magnetic part comprises an inner dipole magnet 118 in the bore 116 of the outer magnetic ring 114 and coupled with the electromechanical lock cylinder 100, wherein an interaction between the uniform magnetic force field of the outer magnetic ring 114 and a magnetic force field 906 of the inner dipole magnet 118 rotates the operation knob 104 further to the one and only magnetic equilibrium position for the inner dipole magnet 118 along the outer magnetic ring 114, whereby the core back end 140 is rotated to the locked rear position by the core front end 122 due to the coupled enforced coupling 124, 142, 146, 148, 150. As there is only one equilibrium position, this embodiment operates without any gearing (such as the planet gearing of FIG. 4A, FIG. 4B and FIG. 4C). Arrows 800 illustrate various magnetization patterns creating the magnetic fields 802, 804. In the embodiment illustrated in FIG. 8A and FIG. 8B, the Halbach cylinder has the Halbach cylinder configuration k=2. In the embodiment illustrated in FIG. 9A and FIG. 9B, arrow 900 illustrates a magnetization pattern of the inner dipole magnet 118. The inner dipole magnet 118 may be, as shown in FIG. 9A and FIG. 9B, a dipole ring magnet magnetized along a radius.

FIG. 5A and FIG. 5B illustrate an alternative embodiment of the return force mechanism operating without magnetic field forces. The embodiment has three equilibrium positions. The return force mechanism comprises three pushers 500A, 500B, 500C with springs 502A, 502B, 502C, a planetary carrier 504 with three cams, planetary cogwheels 506A, 506B, 506C, a central sun gear 508 being fixed to the core body 134, and an external ring 510 with toothing.

In an embodiment illustrated in FIG. 1C, the electromechanical lock cylinder 100 is dimensioned to be accommodated by a housing 158. In a first alternative embodiment also illustrated in FIG. 1C, the electromechanical lock cylinder 100 further comprises a cylinder extension zone 156 of a core body 134 of the electromechanical lock cylinder 100 dimensioned to protrude beyond the housing 158, wherein the operation knob 104 is supported by the cylinder extension zone 156. In a second alternative embodiment (not illustrated), the electromechanical lock cylinder 100 further comprises an external extension zone of a body of the operation knob 104 dimensioned to protrude between the housing 158 and a tapered zone of a core body 134 of the electromechanical lock cylinder 100, wherein the external extension zone is supported by the tapered zone. In a third alternative embodiment (not illustrated), the electromechanical lock cylinder 100 further comprises an internal extension zone of a body of the operation knob 104 dimensioned to protrude between the core front end 122 and a core body 134 of the electromechanical lock cylinder 100, wherein the internal extension zone is supported by the core body 134 of the electromechanical lock cylinder 100.

Even though the invention has been described with reference to one or more embodiments according to the accompanying drawings, it is clear that the invention is not restricted thereto but can be modified in several ways within the scope of the appended claims. All words and expressions should be interpreted broadly, and they are intended to illustrate, not to restrict, the embodiments. It will be obvious to a person skilled in the art that, as technology advances, the inventive concept can be implemented in various ways.

The invention claimed is:

1. An electromechanical lock cylinder comprising:
- a core front end;
- a core back end coupled with a tailpiece;
- an actuator mechanism, switchable between a locked state and an unlocked state, configured to keep the core front end uncoupled with the core back end in the locked state, configured to couple the core front end with the core back end in the unlocked state to enable the core front end to rotate the core back end from a locked rear position to an unlocked rear position, and configured to return to keep the core front end uncoupled with the core back end in the locked state;
- an enforced coupling configured to physically couple the core front end with the core back end as the core front end starts to rotate the core back end away from the locked rear position in the unlocked state, and configured to physically decouple the core front end from the core back end as the core back end returns to the locked rear position;
- an operation knob, coupled with the core front end, configured to enable a user to rotate the operation knob from an initial knob position so that the core front end rotates the core back end from the locked rear position to the unlocked rear position in the unlocked state; and
- a return force mechanism configured to rotate the operation knob further after the user first has rotated the operation knob away from the initial knob position and then released the operation knob, wherein the enforced coupling is configured to keep the core front end coupled with the core back end such that the core back end stays in the unlocked rear position until the operation knob is released,
- wherein the actuator mechanism switches from the locked state to the unlocked state by coupling the core front end to the core back end by inserting a coupling pin into a notch.

2. The electromechanical lock cylinder of claim 1, wherein the return force mechanism comprises a first magnetic part coupled with the operation knob, and a second magnetic part coupled with a core body of the electromechanical lock cylinder, wherein an interaction between a first magnetic force field of the first magnetic part and a second magnetic force field of the second magnetic part rotates the operation knob further, whereby the core back end is rotated to the locked rear position by the core front end due to the coupled enforced coupling.

3. The electromechanical lock cylinder of claim 2, wherein the first magnetic part is configured as an outer magnetic ring coupled with the operation knob, and the second magnetic part is configured as an inner magnetic ring coupled with the core body of the electromechanical lock cylinder.

4. The electromechanical lock cylinder of claim 3, wherein the inner magnetic ring is positioned in a bore of the outer magnetic ring.

5. The electromechanical lock cylinder of claim 3, wherein the outer magnetic ring is arranged as a Halbach cylinder so that a magnetic field is augmented towards a bore of the outer magnetic ring and cancelled towards the operation knob, and the inner magnetic ring is arranged as a Halbach cylinder so that a magnetic field is augmented towards the outer magnetic ring and cancelled towards a bore of the inner magnetic ring.

6. The electromechanical lock cylinder of claim 3, wherein the return force mechanism comprises a planetary gear to transmit the rotation of the operation knob to the core front end with a gear ratio of 1: n, wherein n is greater than 1 and n is equal to a number of magnetic equilibrium positions for the inner magnetic ring along the outer magnetic ring, wherein the magnetic force field between the first magnetic part and the second magnetic part rotates the operation knob further to one of the magnetic equilibrium positions, whereby the core back end is rotated to the locked rear position by the core front end due to the coupled enforced coupling.

7. The electromechanical lock cylinder of claim 2, wherein the first magnetic part comprises an outer magnetic ring coupled with the operation knob to create an uniform magnetic force field inside of a bore of the outer magnetic ring, and the second magnetic part comprises an inner dipole magnet in the bore of the outer magnetic ring and coupled with the electromechanical lock cylinder, wherein an interaction between the uniform magnetic force field of the outer magnetic ring and a magnetic force field of the inner dipole magnet rotates the operation knob further to the one and only magnetic equilibrium position for the inner dipole magnet along the outer magnetic ring, whereby the core back end is rotated to the locked rear position by the core front end due to the coupled enforced coupling.

8. The electromechanical lock cylinder of claim 1, wherein the electromechanical lock cylinder is dimensioned to be accommodated by a housing, the electromechanical lock cylinder further comprising:

a cylinder extension zone of a core body of the electromechanical lock cylinder dimensioned to protrude beyond the housing, wherein the operation knob is supported by the cylinder extension zone.

9. The electromechanical lock cylinder of claim 1, wherein the electromechanical lock cylinder is dimensioned to be accommodated by a housing, the electromechanical lock cylinder further comprising:

an external extension zone of a body of the operation knob dimensioned to protrude between the housing and a tapered zone of a core body of the electromechanical lock cylinder, wherein the external extension zone is supported by the tapered zone.

10. The electromechanical lock cylinder of claim 1, wherein the electromechanical lock cylinder is dimensioned to be accommodated by a housing, the electromechanical lock cylinder further comprising:

an internal extension zone of a body of the operation knob dimensioned to protrude between the core front end and a core body of the electromechanical lock cylinder, wherein the internal extension zone is supported by the core body of the electromechanical lock cylinder.

11. The electromechanical lock cylinder of claim 1, wherein the tailpiece is coupleable to a bolt mechanism.

12. The electromechanical lock cylinder of claim 1, wherein the electromechanical lock cylinder is one of a key-in-knob type cylinder, a key-in-lever type cylinder, a mortise cylinder, a rim cylinder, a small format interchangeable core cylinder, a large format interchangeable core cylinder.

13. The electromechanical lock cylinder of claim 1, wherein the actuator mechanism switches from the locked state to the unlocked state by additionally releasing the core front end to rotate by withdrawing a locking pin from a notch in a core body of the electromechanical lock cylinder.

14. The electromechanical lock cylinder of claim 13, wherein the actuator mechanism switches from the locked state to the unlocked state by changing an internal magnetic field configuration to operate the coupling pin and the locking pin.

15. The electromechanical lock cylinder of claim 1, further comprising:

an antenna in the operation knob to receive wirelessly encrypted data from a portable user apparatus; and a processor to switch the actuator mechanism from the locked state to the unlocked state provided that the received encrypted data matches a predetermined condition.

16. The electromechanical lock cylinder of claim 15, wherein the antenna harvests wirelessly electric energy from the portable user apparatus for the operation of the electromechanical lock cylinder.

17. The electromechanical lock cylinder of claim 1, wherein the return force mechanism is configured to return the knob back to the initial position after the user has turned the knob from the initial position and has then released the knob.

18. The electromechanical lock cylinder of claim 1, wherein the return force mechanism is configured to return the knob to the initial position, and the lock is set to the locked state due to the enforced coupling.

19. The electromechanical lock cylinder of claim 1, wherein the core front end and the core back end are separate components of the electromechanical lock cylinder temporarily couplable to one another via the actuator mechanism such that, (a) when the core front end and the core back end are coupled in unlocked state, rotation of the core front end is transferred to the core back end by operation of the enforced coupling, and (b) when the core front end and the core back end are uncoupled in the locked state, rotation of the core front end is not transferred to the core back end.

* * * * *